United States Patent [19]

Boyle et al.

[11] Patent Number: 5,661,789

[45] Date of Patent: Aug. 26, 1997

[54] METHOD FOR COORDINATING DATA CHANGES AMONG CENTRAL OFFICE SWITCHES

[75] Inventors: Valerie Y. Boyle, Wheaton; Robert Allen Swanson, Naperville, both of Ill.

[73] Assignee: Lucent Technologies Inc., Murray Hill, N.J.

[21] Appl. No.: 448,954

[22] Filed: May 24, 1995

[51] Int. Cl.⁶ .............................. H04M 7/00; H04M 3/42
[52] U.S. Cl. ..................... 379/207; 379/201; 379/220; 379/221
[58] Field of Search ..................... 379/220, 221, 379/201, 207, 60

[56] References Cited

U.S. PATENT DOCUMENTS

| | | | |
|---|---|---|---|
| 4,899,373 | 2/1990 | Lee et al. | 379/207 |
| 5,048,081 | 9/1991 | Gavaras et al. | 379/221 |
| 5,237,604 | 8/1993 | Ryan | 379/207 |
| 5,255,315 | 10/1993 | Bushnell | 379/207 |
| 5,347,564 | 9/1994 | Davis et al. | 379/207 |
| 5,497,412 | 3/1996 | Lannen et al. | 379/60 |

*Primary Examiner*—Ahmad F. Matar
*Attorney, Agent, or Firm*—Mony R. Ghose

[57] ABSTRACT

A method for automatically transferring customer data among a plurality of central office switches comprises receiving a work order message from a central provisioning system at a message directing switch. The message directing switch is in communication with at least one message receiving switch in a local telecommunication network. Upon determining that a particular work order message received from a central provisioning system requires a coordinated data transfer, a data query is formulated in the message directing switch to retrieve specific data, such as data relating to a customer directory number, from a message receiving switch. Once the data is received in the message directing switch, the data is processed and retained in the message directing switch or delivered to another switch in the telecommunications network. The method and system alleviates the need for manual retrieval and installation of specific customer line data when a directory number is moved from one central office switch to another.

14 Claims, 4 Drawing Sheets

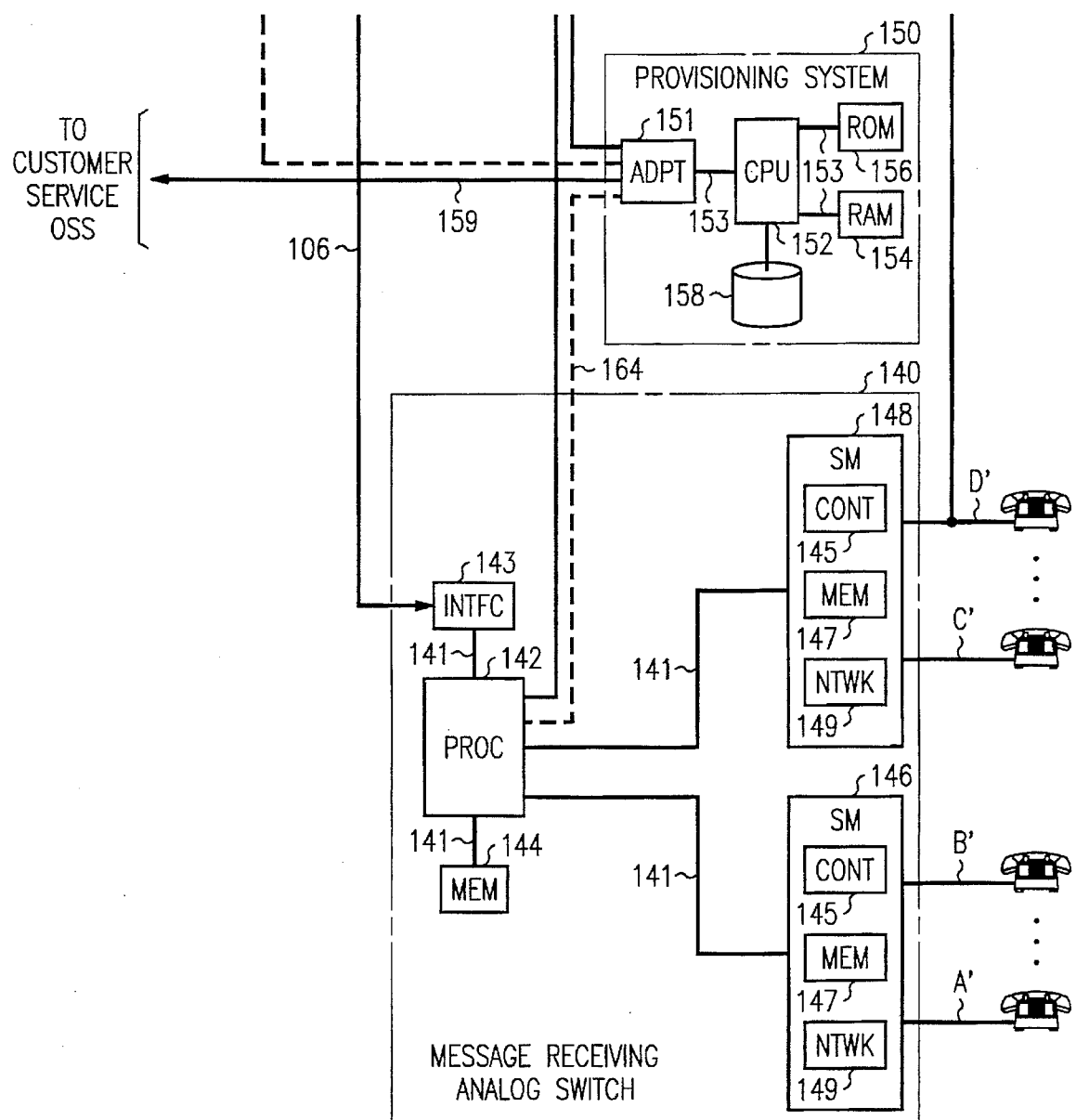
FIG. 1B
FIG. 1C

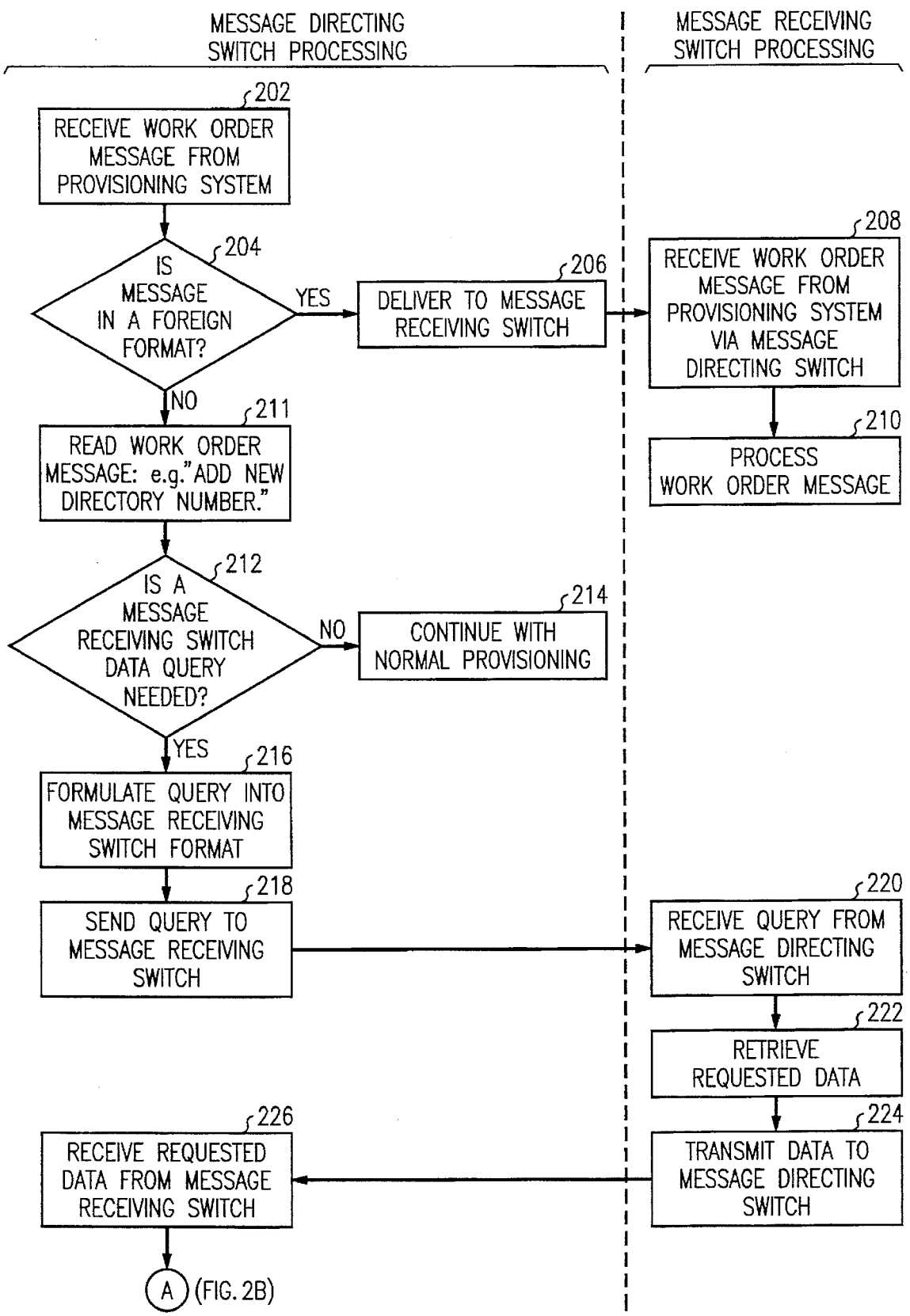

METHOD FOR COORDINATING DATA CHANGES AMONG CENTRAL OFFICE SWITCHES

FIELD OF THE INVENTION

This invention relates to the field of telecommunications networks and, more particularly, to coordinating data changes among central office switches in such telecommunications networks.

BACKGROUND OF THE INVENTION

Over the past decade, the demand for advanced telecommunication services has increased with population growth and technological innovation. One by-product of this demand is the frequent transfer of customer lines among central office switches. A common catalyst for the transfer of customer lines among switches is the "capping" of a central office switch. Capping is a well-known process which is instigated when an existing switch has reached its service capacity and is unable to serve the needs of the growing number of users who require additional telephone lines for equipment such as facsimile machines and personal computers. During the capping process, the growth of the switch is terminated (i.e. the switch is "capped") and additional customer lines are served by a new (usually more technologically advanced) switch. Invariably, some customers who are served by the capped switch request service features which are only available to those served by the new switch. Thus, the transfer of individual customer lines served by a capped (or "old") central office switch to a "new" central office switch is common during a capping process.

Transferring a customer line from one central office switch to another requires manually retrieving customer line data from a first switch and entering the same data into the memory of a second switch. If adding a new service feature is the impetus for the transfer, additional data specific to the newly added service feature must also be entered into the customer data file in the second switch. Since each central office switch typically serves one or more "blocks" of directory numbers (collectively having given office codes) wherein each block of directory numbers has a unique office code, the transfer of a customer line from one switch to another switch normally implies a directory number change. To serve customers who want to retain their current directory numbers during a central office switch change over, systems exist which enable a customer line to receive incoming telephone calls having a directory number with an office code which is different than the office code of the switch by which they are served. An exemplary embodiment of such a system is disclosed in U.S. Pat. No. 5,237,604 to Dierdre T. Hoesl entitled "Arrangement for Serving A Telephone Office Code from Two Switching Systems" which issued on Aug. 17, 1993.

Indeed, most customers who request new service features expect to keep their local directory number, as well as all of the existing features associated with their telephone service. To accommodate a customer's request and to ensure that there is no interruption of service, a carefully coordinated data exchange between switches is necessary.

The prior art coordinated data exchange process is initiated by a central provisioning system which is maintained by a local exchange carrier (LEC) and serves all central office switches in a local telecommunications network. Specifically, transferring customer line data from a first central office switch to a second central office switch requires the intervention of a service technician who receives a service work order from the central provisioning system, manually retrieves all data associated with a given customer directory number from a first central office switch and then manually installs the directory number data into a second central office switch.

The current process for customer directory number data transfer among central office switches is exemplified by the following scenario: A customer who is currently served by an analog switch decides to set up a home office. She plans to install a facsimile machine and personal computer in her home office and determines it would be beneficial to have ISDN service on her telephone line. Accordingly, the customer contacts a service representative of her local exchange carrier and requests ISDN service. Although the customer wants ISDN service, she clearly specifies that she does not want to change her current directory number of "708-555-1234". In response to the customer's request, the service representative enters a service order to provide ISDN service to the customer line identified by the directory number "708-555-1234" into a customer service operation support system (OSS).

Eventually, the service order reaches the central provisioning system which evaluates the order and if possible (i.e. if the LEC maintains a switch capable of providing ISDN to this customer), issues a work order ticket indicating that ISDN service is to be provided to the customer line identified by the directory number "708-555-1234". In this example, assume that the central office switch which serves directory number "708-555-1234" is an analog switch which is incapable of providing ISDN service. However, the LEC also maintains a digital switch (such as the 5ESS® switch sold by AT&T Network Systems) which is capable of providing ISDN service. Thus, to provide ISDN service to this customer, the customer's line must be wired to the digital switch. Nevertheless, in accordance with the customer's request, her local directory number of "708-555-1234" and all existing features of her telephone service must not change.

To complete this service order, a LEC technician physically wires a new customer line from a main distributing frame to the digital central office switch, he retrieves all customer data relating to directory number "708-555-1234" stored in the analog central office switch and enters the retrieved data and the newly requested ISDN feature into the digital central office switch. The technician must also program a new routing index in a separate database so that incoming calls may be properly delivered to the directory number, as is known in the art. After testing the newly established customer line to ensure that it is functioning properly, the technician severs the connection to the analog switch. Due to the manual retrieval and installation of data, the process is labor-intensive, time-consuming and prone to error. Therefore, there is a need in the art for automatically retrieving and installing customer data in a central office switch in response to a work order message received from a provisioning system in a local telecommunications network.

SUMMARY OF THE INVENTION

This need is addressed and a technological advance is achieved in the art by a method and system which enables a message directing central office switch in a local telecommunications network to communicate with at least one other central office switch which acts as a message receiving switch for coordinating customer data exchanges.

In one preferred embodiment of the method of the present invention, the message directing switch is a digital switching system which includes the capability to process all work order messages issued by a central provisioning system which is maintained by a local exchange carrier. More particularly, the digital switch (which may be the "new" switch in a capping scenario) serves as a receiving point for work order messages issued by the central provisioning system. Work order messages determined by the message directing switch to be in a foreign format are delivered to another switch (i.e. the message receiving switch which may be the "old" switch in a capping scenario) for processing therein. Work order messages which require coordinated data exchanges between switches are processed under the control of the message directing switch which uses a transfer processor to carry out a data transfer protocol. More particularly, in coordinated processing cases, the message directing switch formulates a data query in order to retrieve specific data from the switch acting as the message receiving switch. Once the data is received in the message directing switch, it used for normal provisioning processes. Eventually, the message directing switch directs the message receiving switch to delete the data it previously sent to the message directing switch, so that duplicate data is not maintained.

BRIEF DESCRIPTION OF THE DRAWINGS

FIGS. 1A and 1B show a simplified block diagram of a telecommunications network in which a preferred embodiment of the method of the invention may be practiced;

FIG. 1C is a representation of the relationship between FIGS. 1A and 1B;

FIGS. 2A and 2B are flow diagrams of the steps for controlling a coordinated data exchange as performed by a central office switch with message directing capabilities and another central office switch which acts as a message receiving switch in accordance with a preferred embodiment of the present invention.

DETAILED DESCRIPTION

Figure 1A:
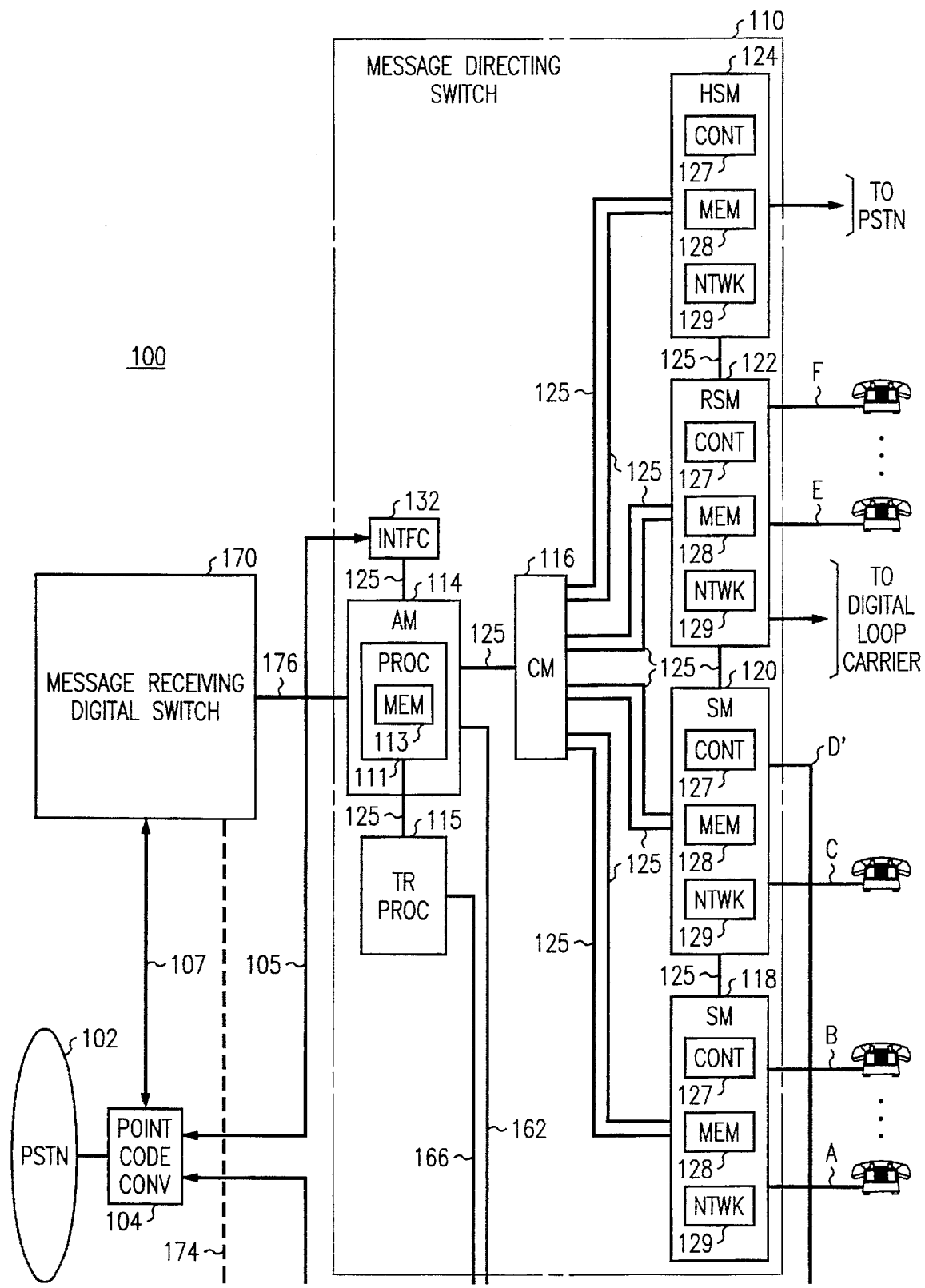

FIGS. 1A and 1B show local telecommunications network 100 including first digital central office switch 110 which has message directing capabilities and is designated the "message directing switch". Two other switches, namely, analog central office switch 140 and digital central office switch 170 are standard central office switches which do not possess message directing capabilities and are generally referred to as "message receiving switches". In a capping scenario, message directing switch 110 is the "new" switch and analog switch 140 is the "old" switch. Digital switch 170 is included to emphasize that any switch (analog or digital) may be a message receiving switch and that message directing switch 110 may coordinate data transfers in which digital switch 170 is the "new" switch in a capping scenario, as explained in detail below. Although only three central office switches are shown in network 100, it is to be understood that an operational telecommunications network may include many more switches and that message directing switch 110 may interact with a cluster of central office switches which act as message receiving switches.

Also shown is point code converter 104 which routes incoming telephone calls from public-switched telephone network (PSTN) 102 to a central office switch in local telecommunications network 100 for those customer lines which retain directory numbers during switch change-overs. A detailed description of the operation of point code converter 104 can be found in commonly assigned U.S. Pat. No. 5,048,081 to Gavaras et al. entitled "Arrangement for Routing Packetized Messages" which issued on Sep. 10, 1991 (hereinafter, the Gavaras et al. patent).

Provisioning system 150 communicates with message directing switch 110 via data link 162 and in one preferred embodiment may communicate with analog switch 140 and second digital switch 170 via data link 164 and data link 174, respectively. Message directing switch 110 and analog switch 140 communicate with each other over intra-switch data link 166 while message directing switch 110 and second digital switch 170 communicate with each other over intra-switch data link 176.

In a preferred embodiment, message directing switch 110 is a digital switch with message directing capabilities such as the 5ESS® switch manufactured and sold by AT&T Network Systems. Switch 110 includes three major components: an administrative module (AM) 114 which provides system wide administration, maintenance, and resource allocation; a communications module (CM) 116 which is a hub for distributing and switching voice or digital data, control information, and synchronization signals; and a plurality of switching modules (SMs) 118 and 120 which perform local switching and control functions as well as provide interfaces to customer lines A, B, C and D'. Remote switching module RSM 122 is similar to switching modules 118 and 120 but it serves distant customer lines E and F via a digital loop carrier (DLC) (not shown). Host switching module HSM 124 is the only switching module in direct communication with PSTN 102. All communication among the elements of message directing switch 110 (including communication among all SMs and between AM 114 and CM 116) is accomplished over Network Control and Time (NCT) links 125. Also shown is interface 132 which receives ported directory number routing information over message link 105 from point code converter 104 in accordance with the teaching of the Gavaras et al. patent.

As mentioned above, AM 114 provides system level interfaces required to operate, administer, and maintain message director switch 110. AM 114 comprises main processor 111, memory 113 and transfer processor 115. Transfer processor 115 is the interface to provisioning system 150 and controls all coordinated data provisioning functions among message directing switch 110, and analog switch 140 and digital switch 170 which act in a message receiving capacity, as described in detail below.

Each switching module in message directing switch 110 includes a controller 127 which coordinates global functions, memory 128 for retaining specific customer line data and network element 129 for routing calls to and from individual customer lines. Consistent with connections in digital switch art, all SMs are connected by two NCT links to CM 116.

Analog switch 140 is representative of an "old" switch in a capping scenario and includes processor 142 for global functions such as common resource allocation and maintenance control, memory 144 for storing various control programs and two switching modules SM 146 and SM 148 which serve customer lines A' B' and C' D', respectively. Customer line D' is connected to both SM 148 of analog switch 140 and SM 120 of message directing switch 110. The dual line connection of line D' indicates that this line is being transferred from analog switch 140 (the "old" switch) to message directing switch 110 (the "new" switch) in a process described below. Alternatively, the digital switch 170 may be designated as the "new" switch. After the transfer process and testing of line D' on message directing switch 110 is complete, the connection of line D' to SM 148 of analog switch 140 is severed. Similar to the switching modules shown in message directing switch 110, each SM in analog switch 140 includes a controller 145, memory 147 and network element 149. All communication among the elements in analog central office switch 140 is accomplished over data links 141. Also shown is interface 143 which receives routing information over message link 106 from point code converter 104 as described in the Gavaras et. al. patent.

Digital switch 170 (shown in simple block form) includes the same elements of message directing switch 110 with the exception of transfer processor 115. Accordingly, digital switch 170 does not possess message directing capabilities but may act (as may any other switch) as a message receiving switch. Switch 170 communicates with message directing switch 110 via intra-switch data link 176, and point code converter 104 via data link 107. In one preferred embodiment, digital switch 170 is in communication with central provisioning system 150 via link 174. While message directing switch 110 is described the "new" switch, it is to be understood that digital switch 170 may serve as the "new" switch when a customer line is transferred from an analog switch (the "old" switch) to a "new" switch in a capping process. When digital switch 170 serves as the "new" switch, it continues to act as a message receiving switch in accordance with the principles of the present invention since it receives all provisioning messages relating to a coordinated data exchange from message directing switch 110.

Provisioning system 150 includes adapter 151, CPU 152, random access memory (RAM) 154, read only memory (ROM) 156 and non-volatile database 158. Adapter 151 enables provisioning system 150 to receive messages from other LEC OSSs over communication link 159. Work order messages directed to message directing switch 110, analog switch 140 or digital switch 170 are also delivered via adapter 151 to the appropriate switch. Communication among the elements of provisioning system 150 is accomplished over data links 153.

During operation, provisioning system 150 receives a service order from a customer service OSS (not shown) via communication link 159 and temporarily stores the order in RAM 154. Subsequently, CPU 152 retrieves the service order from RAM 154 and processes it using a protocol stored in ROM 156. After the service order has been processed, an appropriate work order message may be sent to central office switch 110, 140 or 170. Each work order message sent to a central office switch is categorized by directory number and retained in database 158.

In one preferred embodiment, provisioning system 150 forwards all work order messages, regardless for which central office switch the message is intended, to message directing central office switch 110 for processing over data link 162. In this embodiment, transfer processor 115 of switch 110 receives all work order messages from the provisioning system so that a determination may be made as to whether: the work order requires processing by message directing switch 110 only; the work order requires processing by analog switch 140 only; the work order requires processing by digital switch 170 only; the work order requires coordinated processing between message directing switch 110 and analog switch 140; the work order requires coordinated processing between message directing switch 110 and digital switch 170; or the work order requires coordinated processing between analog switch 140 and digital switch 170.

In another preferred embodiment, provisioning system 150 sends work order messages which only require processing by analog switch 140 or digital switch 170 directly to the appropriate switch via data link 164 or data link 174, respectively. Those work order messages which require processing by message directing switch 110 only, or which require coordinated processing between message directing switch 110 and any other switch in telecommunications network 100 are delivered to message directing switch 110 over data link 162 in the manner described above.

Figure 2B:
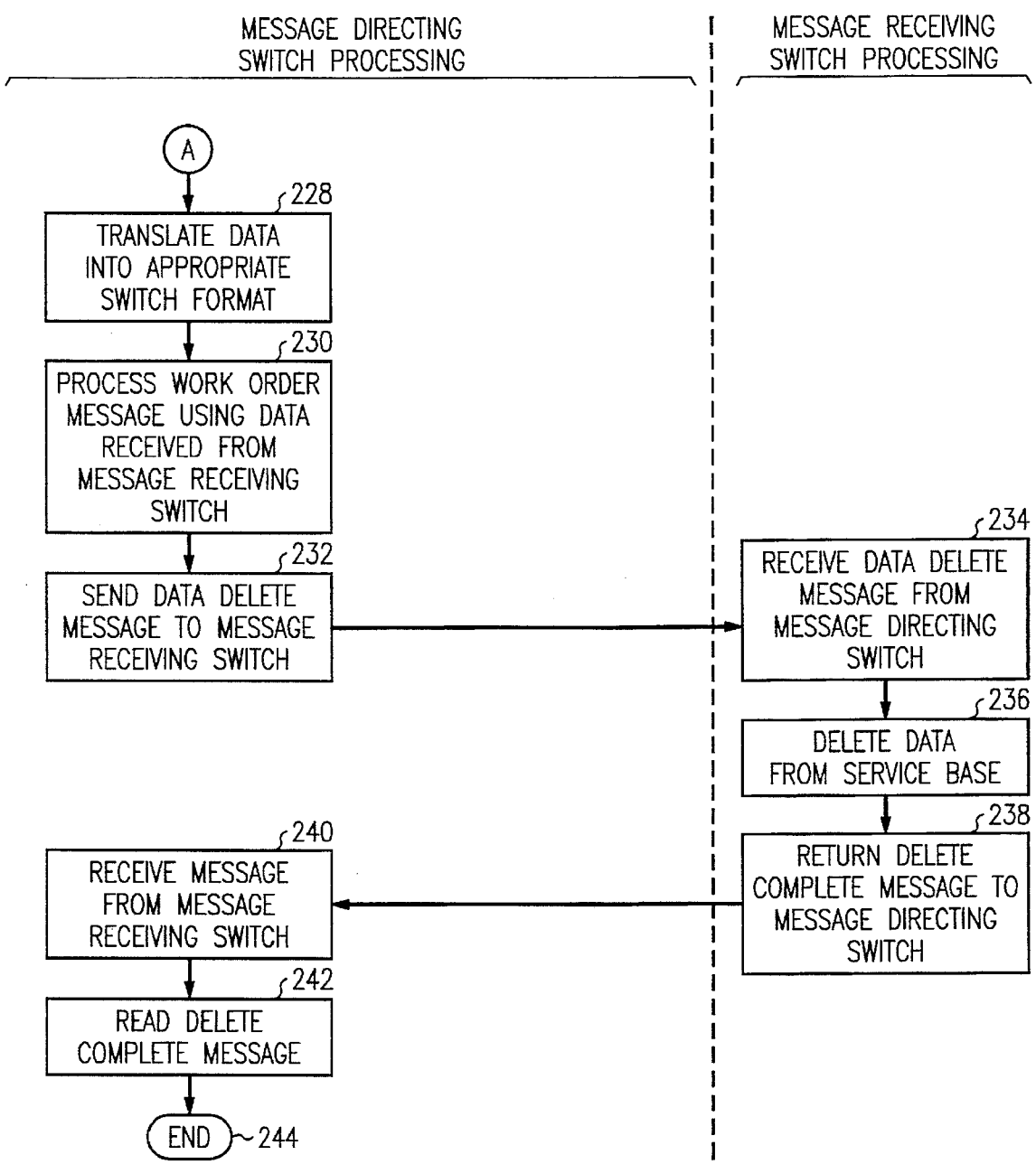

FIG. 2 is a divided flow diagram of the method steps for controlling coordinated processing performed by message directing switch 110 serving as the "new" switch in a capping process with respect to analog switch 140 which is the "old" switch in the capping process, in response to a work order message received from provisioning system 150.

For clarity, the above example of a customer who desires ISDN telephone service but does not want to change her current directory number of "708-555-1234" is continued. Assume that this customer is currently served by line D' of capped analog switch 140 (See FIG. 1). Since switch 140 is an analog switch, it is incapable of providing ISDN service. Therefore, the customer's line (line D') must be manually wired to message directing switch 110 (the "new" switch) in order to receive ISDN service but must, in accordance with the customer's wishes, retain all of its existing characteristics (i.e. directory number, features and billing information). Although, in this example, message directing switch 110 also serves as the "new" switch, customer line D' could have been transferred to digital switch 170 in which case the role of switch 110 would simply be to facilitate a data transfer process.

The coordinated data transfer process begins in step 202 in which switch 110 receives a work order message over data link 162 from provisioning system 150. In decision step 204, transfer processor 115 makes a determination as to whether the work order message received from provisioning system 150 is in a foreign format. In this example, transfer processor 115 determines whether the work order message is in analog switch 140 or digital switch 170 format. If the outcome of step 202 is a "YES" decision, the process continues to step 206 in which the entire work order message is delivered to either switch 140 or switch 170 (i.e. a message receiving switch). In step 208, the message receiving switch receives the work order message from switch 110 over data link 166 or data link 176 and processes the work order in step 210. (In an alternative embodiment, the message receiving switch receives the work order message directly from provisioning system 150.)

If the outcome of decision step 204 is a "NO" decision, the process continues to step 211 in which the work order message received from provisioning system 150 is read by transfer processor 115 of message directing switch 110. In this example, the work order message from provisioning system 150 requires the addition of new directory number "708-555-1234" to the service base (i.e. the accumulation of all customer lines) of message directing switch 110. If the new directory number was to be added to the service base of another switch such as digital switch 170, however, switch 110 would simply facilitate a data transfer process between the switch which currently serves directory number "708-555-1234" (analog switch 140) and digital switch 170 without changing its own service base. In decision step 212, transfer processor 115 makes a determination as to whether the work order message received requires a data query from another switch. Generally, all additions of directory numbers to the service base of a switch require a data query. If the outcome of decision step 212 is a "NO" decision, message directing switch 110 continues with normal provisioning in step 214. If the outcome of decision step 212 is a "YES" decision, the process continues to step 216 in which transfer processor 115 formulates a data query in the other switch format. In this example, the data query is a request for all customer data relating to directory number "708-555-1234" is formulated in analog switch 140 format, assuming that the directory number is in the analog switch's service base. The process continues to step 218 in which the data query formulated by transfer processor 115 is delivered to analog switch 140 over data link 166.

In step 220, processor 142 of analog switch 140 receives the data query from message directing switch 110. The process continues to step 222 in which analog switch 140, acting in its message receiving switch capacity, finds directory number "708-555-1234" and retrieves all data relating to the directory number. In step 224, analog switch 140 transmits the directory number data to message directing switch 110 over data link 166.

In step 226, switch 110 receives data relating to directory number "708-555-1234" from analog switch 140 and stores it in memory 113. The process continues (through connector A to FIG. 2B) to step 228 in which transfer processor 115 translates the data received from analog switch 140 into an appropriate switch format. In this case, the work order message from provisioning system 150 requires the new customer line D' to be added to the message directing switch 110 service base. Thus, the data received from analog switch 140 must be translated to switch 110 format. If the work order message required line D' to be added to the service base of switch 170, the translation of the data would be to digital switch 170 format. In step 230, switch 110 uses the data received from the analog switch to process the work order message received from provisioning system 150. In this example, processing the work order message implies that message directing switch 110 adds new directory number "708-555-1234" and all its corresponding customer data including existing features, billing information and the recently requested ISDN service to its service base. In an alternative embodiment, processing the work order message may mean that switch 110 delivers all data corresponding to directory number "708-555-1234" over data link 176 to digital switch 170 for addition of the directory number to the digital switch 170 service base.

The process continues to step 232 in which message directing switch 110 sends a delete directory number "708-555-1234" message over link 166 to processor 142 of analog switch 140. In step, 234, the delete message is received by analog switch 140. The process continues to step 236 in which processor 142 of analog switch 140 deletes directory number "708-555-1234" and all information relating thereto from its service base. In step 238, analog switch 140 returns a "delete complete" message to message directing switch 110. In step 240, message directing switch 110 receives the delete complete message. In step 242, switch 110 reads the delete complete message from analog switch 140 and the data transfer process ends in step 244.

After the data transfer process is complete and the newly established customer line D' on message directing switch 110 has been tested, a LEC technician severs the connection from line D' to analog switch 140. The above-described automation of the data transfer process greatly reduces the inefficiency associated with manually retrieving data from one central switch and installing the data into another central office switch.

It is to be understood that the above-described embodiment is for illustrative purposes only and that numerous other arrangements of the invention may be devised by one skilled in the art without departing from the scope of the invention. For example, although in the above example a directory number was transferred from an analog switch to the message directing switch, it is envisioned that a message directing switch could also direct a transfer of directory number data from its service base to any other switch.

The invention claimed is:

1. In a telecommunication network comprising a plurality of switches and a central provisioning system, a method for automatically coordinating data among switches comprises:

receiving a work order message from the central provisioning system at a message directing switch;

determining that the work order message received requires the message directing switch to coordinate a data transfer process involving a message receiving switch;

the message directing switch querying the message receiving switch for data relating to subscriber accounts, wherein the query is in a switch format other than the message directing switch format;

the message directing switch translating the data received responsive to the query into message directing switch format; and the message directing switch using the data to update its subscriber database.

2. The method of claim 1 and further comprising:

the message directing switch determining that the work order message received is in a foreign switch format;

the message directing switch identifying the switch format of the work order message; and using the identification of the switch format to deliver the work order message to an appropriate message receiving switch.

3. The method of claim 1 wherein the step of the message directing switch querying the message receiving switch comprises the message directing switch formulating a request for all data relating to a specific directory number.

4. The method of claim 1 wherein the step of the message directing switch translating the data received responsive to the query further comprises using a transfer processor in the message directing switch to translate data received from the message receiving switch into a format other than message directing switch format.

5. The method of claim 1 wherein the step of using the data to update its subscriber database comprises the steps of:

adding the data received from the message receiving switch to a subscriber data base of the message directing switch; and deleting the data received from the message receiving switch from a subscriber data base of the message receiving switch.

6. The method of claim 1 wherein the step of the message directing switch using the data to update its subscriber database comprises the step of:

delivering the data received from the message receiving switch for addition to a subscriber data base of a switch other than the message directing switch.

7. In a telecommunication system comprising a plurality of central office switches interconnected by intra-switch links and a central provisioning system, wherein the central provisioning system communicates with each central office switch over a specific data link, a method for coordinating data transfers among at least two central office switches comprises:

receiving, via one of the specific data links, a work order message from the central provisioning system at a first switch, wherein the first switch is a message directing switch;

formulating a data query message in the first switch for delivery to a second switch;

transmitting data from the second switch over one of the intra-switch data links to the first switch in response to the data query from the first switch;

processing the work order message in the first switch using data received from the second switch; and deleting data in the second switch in response to a message received from the first switch.

8. The method of claim 7 wherein the step of formulating a data query in the first switch comprises using a transfer processor in the first switch.

9. The method of claim 7 wherein the step of processing the work order message in the first switch using data received from the second switch comprises:

adding a directory number and all associated feature data to a service base of the first switch.

10. The method of claim 7 wherein the step of processing the work order message in the first switch using data received from the second switch comprises:

adding a directory number and all associated feature data to a service base of a third switch.

11. The method of claim 7 wherein the step of deleting data in the second switch response to a message received from the first switch comprises:

deleting directory number data from a service base of the second switch.

12. A telecommunications network comprising:

a message directing switch including a transfer processor for coordinating data transfers among a plurality of switches;

a message receiving switch in communication with the message directing switch, wherein the message receiving switch includes means for receiving data queries relating to data transfers from the message directing switch; and a central provisioning system including a data link to the message directing switch for transmitting data transfer work order messages to the message directing switch for translating work order messages into a format other than the format in which the message directing switch operates.

13. The telecommunications network of claim 12 and further comprising a data link between the central provisioning system and the message receiving switch.

14. The telecommunications network of claim 12 wherein the transfer processor translates work order messages into a message receiving switch format.

\* \* \* \* \*